(12) United States Patent
Zimmerman

(10) Patent No.: US 7,301,474 B2
(45) Date of Patent: Nov. 27, 2007

(54) WIRELESS COMMUNICATION SYSTEM AND METHOD

(75) Inventor: Thomas H. Zimmerman, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 887 days.

(21) Appl. No.: 10/086,023

(22) Filed: Feb. 28, 2002

(65) Prior Publication Data

US 2003/0098799 A1 May 29, 2003

Related U.S. Application Data

(60) Provisional application No. 60/333,950, filed on Nov. 28, 2001.

(51) Int. Cl.
*G01V 1/22* (2006.01)

(52) U.S. Cl. ............ 340/854.6; 340/850; 340/853.8

(58) Field of Classification Search ............ 340/853.7, 340/854.6, 850, 851, 853.8, 853.9; 166/66, 166/373, 53, 337, 336; 367/82; 73/152.54
See application file for complete search history.

(56) References Cited

U.S. PATENT DOCUMENTS

| | | | | |
|---|---|---|---|---|
| 4,578,675 A | * | 3/1986 | MacLeod | ........... 340/853.7 |
| 4,806,928 A | | 2/1989 | Veneruso | |
| 4,839,644 A | * | 6/1989 | Safinya et al. | ........... 340/854.3 |
| 5,172,112 A | | 12/1992 | Jennings | |
| 6,151,961 A | | 11/2000 | Huber et al. | |
| 6,160,492 A | | 12/2000 | Herman | |
| 6,192,980 B1 | | 2/2001 | Tubel et al. | |
| 6,223,675 B1 | | 5/2001 | Watt et al. | |
| 6,252,518 B1 | | 6/2001 | Laborde | |
| 6,603,977 B1 | * | 8/2003 | Walsh et al. | ........... 379/45 |
| 6,655,453 B2 | * | 12/2003 | Head | ........... 166/77.1 |
| 6,831,571 B2 | * | 12/2004 | Bartel | ........... 340/854.6 |
| 6,917,611 B2 | * | 7/2005 | Dorenbosch et al. | ........... 370/352 |

FOREIGN PATENT DOCUMENTS

| | | |
|---|---|---|
| GB | 2353546 A | 2/2001 |
| GB | 2369759 A1 | 5/2002 |
| WO | WO 01/63804 A1 * | 2/2000 |
| WO | 2001/63804 A1 | 8/2001 |

\* cited by examiner

*Primary Examiner*—Brian Zimmerman
*Assistant Examiner*—Hung Q Dang
(74) *Attorney, Agent, or Firm*—Trop, Pruner & Hu, P.C.; Kevin B. McGoff; Bryan P. Galloway

(57) ABSTRACT

A wireless communication system for use in well, subsea, and oilfield-related environments employs one or more wireless network devices that offer short-range wireless communication between devices without the need for a central network which may have a device using a BLUETOOTH protocol. The system may be used for telemetry, depth correlation, guidance systems, actuating tools, among other uses. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims. 37 CFR 1.72(b).

11 Claims, 3 Drawing Sheets

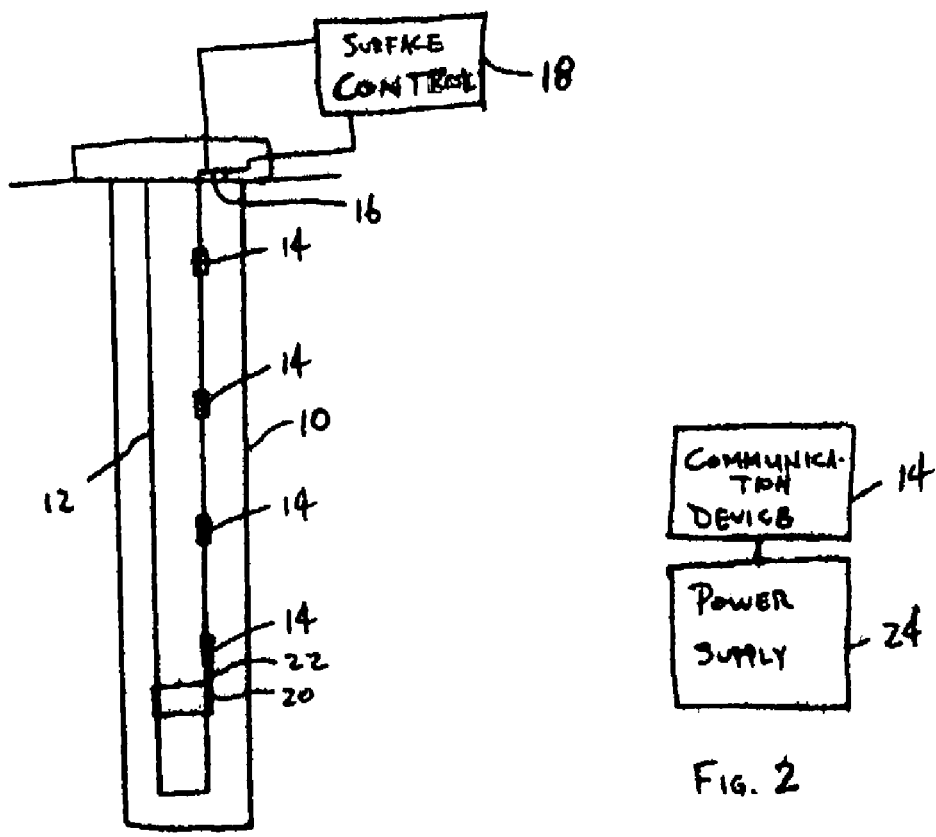
Fig. 1
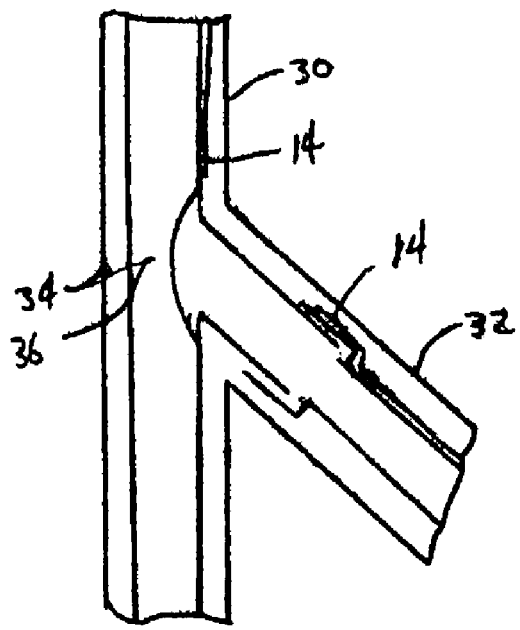
Fig. 2
Fig. 3

WIRELESS COMMUNICATION SYSTEM AND METHOD

CROSS-REFERENCE TO RELATED APPLICATION

This application is based upon and claims priority to U.S. provisional application Ser. No. 60/333,950, filed Nov. 28, 2001.

BACKGROUND OF THE INVENTION

Field of the Invention

The present invention relates to the field of communication. More specifically, the invention relates to a device and method for communicating in a hydrocarbon or water well related application such as downhole or at the wellhead or in a subsea or other oilfield-related environment.

SUMMARY

In general, according to one embodiment, the present invention provides a wireless communication system for use in well, subsea, and oilfield-related environments. Other features and embodiments will become apparent from the following description, the drawings, and the claims.

BRIEF DESCRIPTION OF THE DRAWINGS

The manner in which these objectives and other desirable characteristics can be obtained is explained in the following description and attached drawings in which:

FIG. 1 illustrates an embodiment of a wireless network system in a well.

FIG. 2 illustrates a wireless network device interconnected to a power supply.

FIG. 3 illustrates another embodiment of a wireless network system in a multilateral well.

Figure 4:
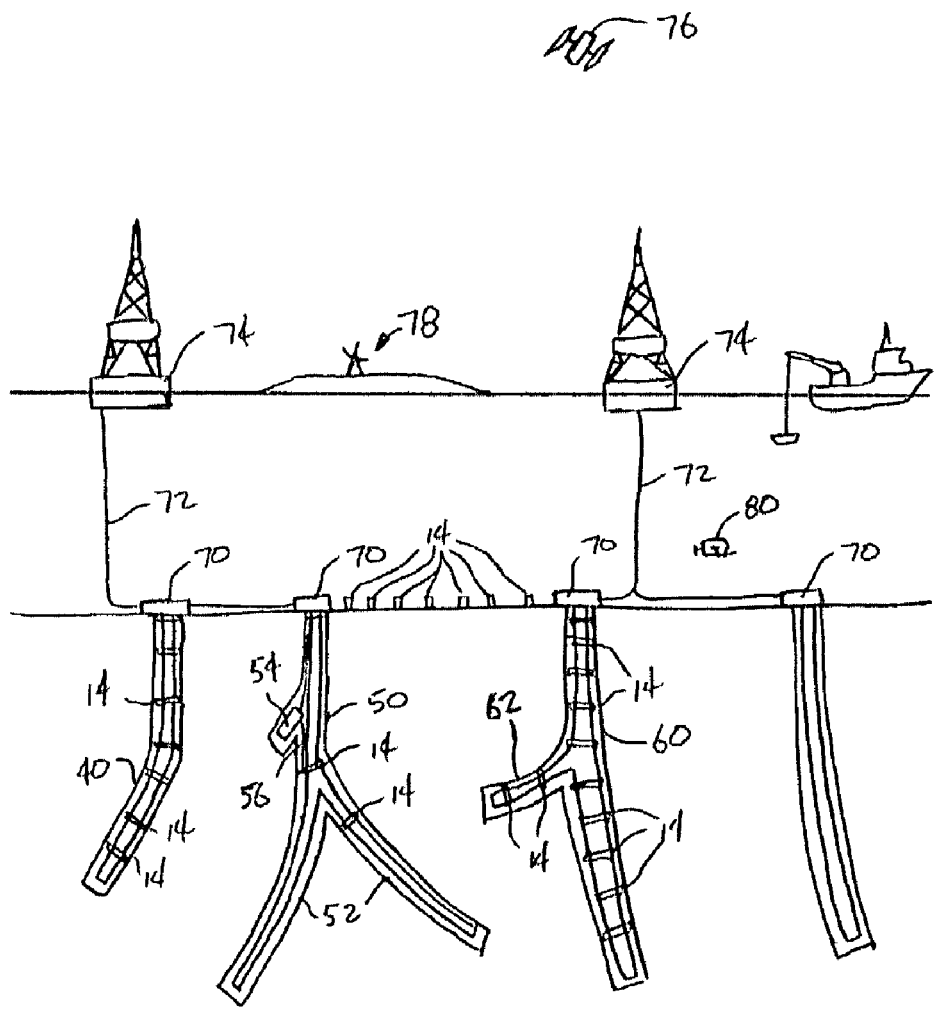
FIG. 4 illustrates embodiment of a wireless network system in a subsea field.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

In the following description, numerous details are set forth to provide an understanding of the present invention. However, that the present invention may be practiced without these details and that numerous variations or modifications from the described embodiments may be possible.

The present invention is directed to a wireless communications device, e.g. cellular and/or BLUETOOTH (see www.bluetooth.com), capable of communicating with like communication devices to transfer data. Present telecommunication system technology includes a wide variety of wireless communication systems associated with both voice and data communications. One such system is named BLUETOOTH after a $10^{th}$ century Scandinavian king who united several Danish kingdoms. This system operates in the 2.4 GHz band and offers short-range wireless communication between BLUETOOTH devices without the need for a central network.

The BLUETOOTH system provides a 1 Mb/sec data rate with low energy consumption for battery-powered devices operating in the 2.4 GHz ISM (industrial, scientific, medical) band. The current BLUETOOTH system provides up to about a 100-meter range capability. The BLUETOOTH protocol treats all radios as peer units identified by unique 48-bit addresses. At the start of any connection, the initiating unit is a temporary master. This temporary assignment, however, may change after initial communications are established. Each master may have active connections of up to seven slaves. Such a connection between a master and one or more slaves forms a "piconet." Link management allows communication between piconets, thereby forming "scatternets."

The BLUETOOTH protocol uses time-division duplex (TDD) to support bi-directional communication. Frequency hopping spread-spectrum technology that accommodates frequency diversity permits operation in noisy environments and permits multiple piconets to exist in close proximity. This is so because frequency diversity is inherent in frequency hopping, especially when it is wide, as in the case of BLUETOOTH (spread over a band of about 80 MHz). The frequency hopping transmission hops at a rate of about 1600 hops per second over 791-MHz channels between 2402 MHz and 2480 MHz. Various error-correcting schemes permit data packet protection by ⅓- and ⅔-rate forward error correction. Further, BLUETOOTH uses retransmission of packets for guaranteed reception. These schemes help correct data errors, but at the expense of throughput.

While BLUETOOTH is described herein as the primary protocol, it should be understood that any other wireless communication protocols, such as wireless LAN or wireless protocols operating in a different frequency range, could be used for similar effect. For the purpose of the present invention, the term "wireless network devices" shall mean devices that offer short-range wireless communication between devices without the need for a central network, which may comprise devices using a BLUETOOTH protocol. Similarly, the term "wireless network system" shall mean a system incorporating wireless network devices.

Referring to FIG. 1, a well 10 extends into the earth. A conduit 12 positioned within the well 10 has a plurality of wireless network devices 14 spaced along the conduit 12. The wireless network devices 14 provide telemetry in the well 10 and communicate with an interlink wireless device 16, such as BLUETOOTH device, positioned proximal the surface of the well 10. The interlink wireless device 16, such as BLUETOOTH device, communicates with a controller 18.

The well telemetry provided by the wireless network devices 14 may be used to communicate with devices in the well. Such a device is shown schematically in FIG. 1 as device 20. The device 20 is connected to a wireless network device 14 by a communication line 22. For example, the wireless network devices 14 may be used to communicate with gauges, sensors, valves, sampling devices, a device used in intelligent or smart well completion, temperature sensors, pressure sensors, flow-control devices, flow rate measurement devices, oil/water/gas ratio measurement devices, scale detectors, actuators, locks, release mechanisms, equipment sensors (e.g., vibration sensors), sand detection sensors, water detection sensors, data recorders, viscosity sensors, density sensors, bubble point sensors, composition sensors, resistivity array devices and sensors, acoustic devices and sensors, other telemetry devices, near infrared sensors, gamma ray detectors, $H_2S$ detectors, $CO_2$ detectors, downhole memory units, downhole controllers, perforating devices, shape charges, firing heads, locators, and other downhole devices.

FIG. 2 is a diagram showing a wireless network device 14 communicating with a power source 24. The power source may be any power source suitable for use downhole, such as a battery, a fuel cell, a downhole power generator or a power communication line extending to the surface.

FIG. 3 shows a multilateral well 30 having a lateral branch 32 and a parent bore 34. The multilateral well 30 contains a completion such as a multilateral junction 36 at the junction of the lateral 32 and the parent bore 34. Other multilateral completion schemes are possible. The multilateral well 30 also has a wireless network device 14 in the parent bore 34 and a wireless network device 14 in the lateral 32. The wireless network devices 14 provide telemetry between the lateral 32 and parent bore 34. Although shown in the figure as connected to communication lines providing further telemetry to other equipment in the well or to the surface, the wireless network devices 14 may communicate via other wireless network devices 14 or by other telemetry devices used in wells. Further, the wireless network devices 14 could be incorporated into a downhole tool or device eliminating the need for further telemetry equipment.

FIG. 4 shows the use of wireless network devices 14 in multiple wells and in the subsea and subsea field environment. In the figure, a well 40 contains a plurality of wireless network devices 14 to provide wellbore telemetry therein. Another well 50 is a multilateral well having two lateral branches 52. The wireless network devices 14 in well 50 provide telemetry between the parent bore and at least one of the laterals 52. The upper device 14 communicates with a downhole device 54 by way of the communication line 56. The downhole device 54 may be a downhole controller, a downhole processing device (e.g., an oil-water separator), a downhole power supply (e.g., a fuel cell, a battery, or a power generator), or the like. In the other shown multilateral well 60, the wireless network devices 14 provide telemetry in the well, including telemetry along the length of the lateral. In well 60, the lateral 62 has a plurality of wireless network devices 14 therein.

The wellheads 70 or other near-surface portions of the wells may include wireless network devices 14 to provide telemetry through the wellhead or between the well and wireless network devices 14 separate from the well. For example, a wireless network device 14 in the wellhead may be connected to a communication line 72 (e.g., electric lines, fiber optic lines), such as an umbilical, extending to a platform 74 or other offshore surface location. Information from the well may then be relayed via satellite 76 to a land-based location 78. Other forms of communication, such as common telecommunications methods, a telephone system, the Internet, an intranet, and other "secondary communication systems," may also be used to send the information from the surface location to the end user or end controller. Thus, a secondary communication system may be used to provide communication between a wireless network device and a land-based location or an offshore surface location.

The wellheads or other subsea devices or structures may use wireless network devices 14 to communicate with other subsea devices or structures. For example, wireless network devices 14 may be used to provide telemetry between a downhole structure (e.g., such as a wellhead 70, subsea processing or power generation equipment) or a subsea monitor, and a subsea vehicle 80, such as a ROV ("Remote Operated Vehicle") or AUV ("Autonomous Underwater Vehicle").

Further, the wireless network devices 14 may be spaced about the sea floor, which could include embedding the devices in the sea floor, to provide subsea telemetry. Such a set of wireless network devices 14 may also be used for subsea guidance, for example, for an AUV. In one embodiment, the wireless network devices 14 are spaced about the sea floor to form an array of devices 14.

Figure 5:
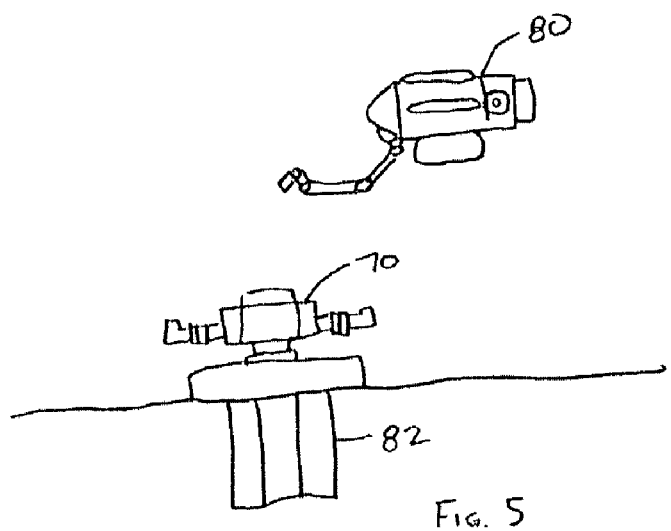
FIG. 5 illustrates embodiment of a wireless network system used in conjuction with a well and a subsea vehicle.

FIG. 5 shows an AUV 80 proximal a well 82 having a wellhead 70. The wellhead 70 and AUV 80 are equipped with wireless network devices 14 to provide for telemetry therebetween. In one embodiment, the well 82 or wellhead 70 has a memory storage device (not shown) that stores data collected from the well 82 or the surrounding environment. When the AUV 80 approaches, the data from the storage device is transmitted to the AUV 80 via the wireless network devices 14, such as BLUETOOTH devices. In this way the data is taken from the well to a surface location or other location (e.g., a relay station) via an AUV 80 for further transmission and use.

Figure 6:
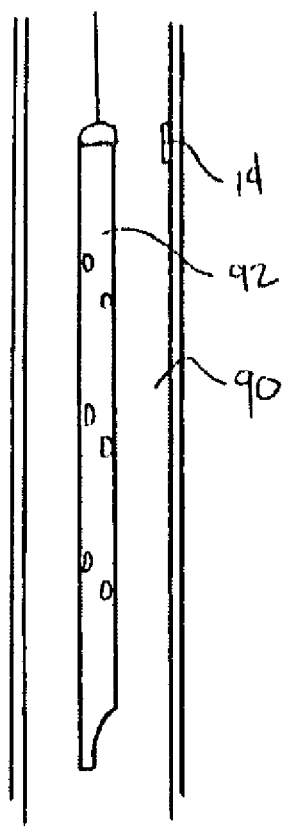
FIG. 6 illustrates embodiment of a wireless network system in a well.

FIG. 6 discloses an embodiment of the present invention in which the wireless network devices 14 are used for depth correlation and/or actuating instruction. A tool 92 containing a wireless network device 14 communicates with a wireless network device 14 located in the well 90. One or more wireless network devices 14 are placed in the well 90 at known locations. As the tool 92 approaches the wireless network device 14 the wireless network device 14 in the tool 92 detects the other device 14 mounted in the well. The wireless network device 14 mounted in the well may be programmed to, for example, transmit a location code that will be detected by the device 14 in the tool when the devices 14 come within telemetry range of one another. In another embodiment, the tool 92 simply uses an identifier of the wireless network device 14 to correlate the position of the tool 92 in the well. The tool 92 may incorporate a depth correlation circuitry therein that communicates with the tools wireless network device 14 and uses the information detected therefrom to determine the depth of the tool 92. If a plurality of devices 14 are positioned in the well 90, the tool 92 may use a triangulation of the signals to determine its position relative to the devices 14. Further, the tool 92 may detect the relative strength of the signal between the device 14 in the tool 92 and the device 14 in the well 90 to more closely determine its position. The use of multiple spaced wireless network devices 14 may further increase the accuracy of the depth correlation. As examples of the actuating signal, the device 14 mounted in the well 92 transmits a fire signal or a safety release signal as to a perforating gun. Although the tool 92 is shown in FIG. 6 as a perforating gun, the tool could be any downhole device. Also, although characterized as a transmitted depth or actuating signal, the actual signal could simply be an identifier or any other type of signal that, when detected, is interpreted by the tool 92 as a depth or actuating signal. Thus, the transmitted signal from the wireless network device mounted in the well need not take any specific form, although in some embodiments it may. The tool 92 may have an actuating circuitry therein communicating with the wireless network device 14 that actuates the tool 92 by way of an output actuating signal that is based upon information received from the interconnected wireless network device 14. As additional examples, the tool 92 may be (1) a valve that is opened or closed in response to an actuating command from the actuating circuitry, (2) a release that releases in response to the command, or (3) a recorder that begins recording in response to the signal.

Figure 7:
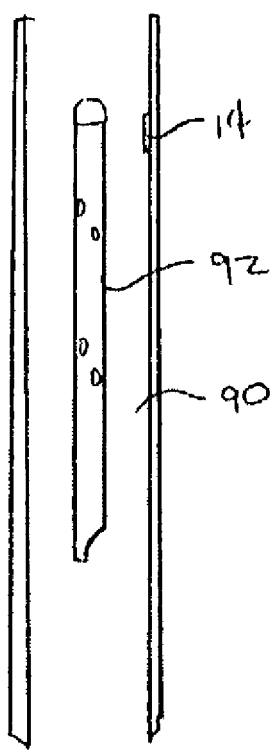
FIG. 7 illustrates embodiment of a wireless network system in a well.

FIG. 7 shows an alternative embodiment wherein a tool 92 is dropped in a well 90. As the tool 92 comes within proximity of the wireless network device 14 mounted in the well, the tool 92 is actuated. In one embodiment, the tool 92 is a perforating gun that fires when the signal from the wireless network device 14 mounted in the well is received. In another embodiment, the tool 92 is a sampler that takes a sample and subsequently alters its buoyancy to float to the surface after receiving the signal from the wireless network device 14, such as BLUETOOTH device. In yet another exemplary embodiment, the tool 92 is a sensor that take one or more readings and changes buoyancy upon receipt of the signal. The sensor may include a memory device. In another embodiment the tool 92 contains one or more sensors that are released as the tool 92 passes a wireless network device 14, such as BLUETOOTH device. The released sensors may take one or more readings (which may be stored in a memory device, including electronic or mechanical memory) and float to the surface for collection and analysis. Note that the tool 92 adapted to release buoyant sensors may be used without a wireless network device 14 and may use some other actuating signal, such as a pressure reading, a timer, a pressure pulse signal, or some other sensor reading.

Figure 8:
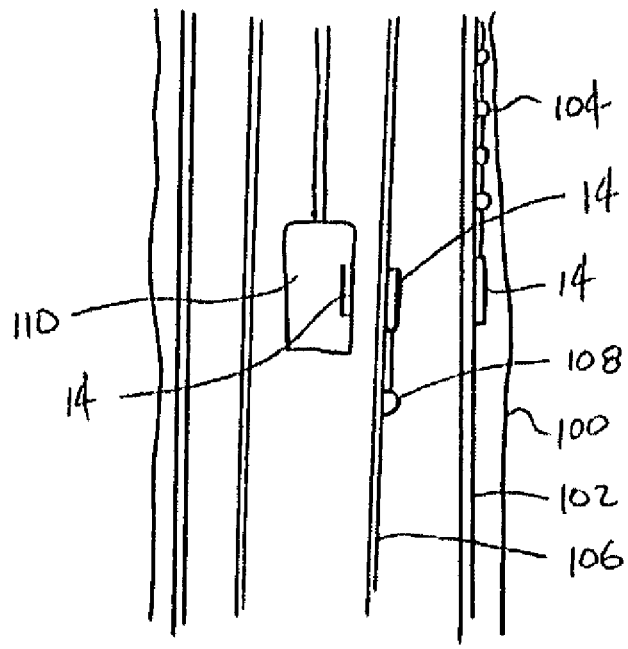
FIG. 8 illustrates embodiment of a wireless network system in a well.

FIG. 8 illustrates how the wireless network devices 14 may be used to communicate through tubing and through casing. Although both types of communication are shown, it should be appreciated that either through tubing or through casing communication may be used in combination with or exclusive from the other. In the figure, a well 100 is lined with a casing 102. As used herein, the casing 102 may include a liner or other device used to line the well, including sand screens, expandable tubings, and other completion equipment placed in an open hole. An array 104, such as a resistivity array, is connected to the outside of the casing 102. A wireless network device 14 communicates with the array 104. Accordingly, data from the array 104 may be transmitted from the interconnected wireless network device 14 to a wireless network device 14 located within the casing. The data may be stored downhole in a memory device connected to the array 104 until collected by a tool 110, for example. In this way, the need to run control lines from a device on the outside of the casing to the top or bottom of the casing or to penetrate the casing is eliminated. Although the device shown in the figure is an array, the wireless network device 14 may be connected to any device mounted on the outside of the casing or positioned outside of the casing.

FIG. 8 also shows a tubing 106 positioned in the well 100. Mounted to the outside of the tubing 106 is a device 108, such as a sensor. A wireless network device 14 is interconnected to the device 108 and may be used to transmit data from the device 108 to another wireless network device 14 positioned within the tubing 108. As shown in FIG. 8 as an example, a tool 110 containing a wireless network device 14 may be lowered into the well 100 through the tubing 106. Once the tool is positioned within range of the wireless network device 14 connected to the outside of the tubing 106 and interconnected to the device 108, the data from the device 108 may be transferred from the device 108 or from a memory device connected thereto to the tool 110. The tool 110 contains a memory device for storing the data for use upon retrieval from the well. Note that the wireless network device 14, such as BLUETOOTH device mounted on the outside of the tubing 106 may be used to relay information to and from the wireless network device 14, such as BLUETOOTH device located on the outside of the casing 102.

This invention has been described in considerable detail in order to provide the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the scope of the present invention, as defined in the claims that follow. Although the present invention has been described in association with a BLUETOOTH communication protocol, for example, the present invention can be implemented using any suitable wireless communication protocol. Those skilled in the art of wireless communication will appreciate that the principles of the invention described and claimed herein also apply to wireless communications throughout the world. Further, signal processing methods of the present invention can be implemented in hardware or software, or a combination of both. In one embodiment, the functions of a wireless device (including a BLUETOOTH device), designed in conformance with the principals set forth herein are implemented as one or more integrated circuits using a suitable processing technology, e.g., CMOS, HBT.

As another example, at least portions of the present invention may be implemented in computer programs, i.e. algorithms, executing on programmable baseband systems each comprising a data processor, e.g. DSP, a data storage system, including both volatile and non-volatile memory and/or data storage devices, at least one input device, e.g. keyboard, A/D converter (part of GPS, "BLUETOOTH," Cell radio), and at least one output device, e.g. display, auditory device, touch sensitive device, D/A converter (BLUETOOTH). Program code is applied to input data received via at least one antenna (array) to perform the functions described herein and generate output information. The output information is applied to one or more output devices, in known fashion. Each such program may be implemented in a high level procedural or object oriented programming language to communicate with a baseband computer system. However, the programs can be implemented in assembly or machine language, if desired. In any case, the language may be a compiled or interpreted language. Portions of the inventive structure and method may also be considered to be implemented as a computer-readable storage medium, configured with a computer program, where the storage medium so configured causes a data processor to operate in a specific and predefined manner to perform the functions described herein. An example of one such type of data processor is a digital signal processor (DSP).

Although only a few exemplary embodiments of this invention have been described in detail above, it will be readily appreciated that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

I claim:

1. A system comprising:
 a tool having a first wireless network device, the tool movable in the well;
 at least a second wireless network device in the well located at a predetermined position therein;
 a depth correlation circuitry in the tool in communication with the first wireless network device in the tool to detect a signal from the first wireless network device for determining the depth of the tool in the well, the signal from the first wireless network device based on wireless communication between the first and second wireless network devices; and
 a third wireless network device in the well;
 wherein the signal is based on triangulation among the first, second, and third wireless network devices.

2. A subsea telemetry system, comprising:
 a wireless network device positioned proximal the sea floor;
 a subsea vehicle having a wireless network device therein that is adapted to communicate with the wireless network device positioned proximal the sea floor; and
 a guidance circuitry of the subsea vehicle in communication with the wireless network device of the subsea vehicle, the guidance circuitry adapted to determine the relative position of the subsea vehicle based upon input from the interconnected wireless network device.

3. A system for use in a well, comprising:
 a tool containing a first wireless network device, the tool movable in the well during a downhole operation;
 a second wireless network device for location in the well, wherein the first wireless network device is outside a wireless communication range of the second wireless network device until the tool is moved into proximity of the second wireless network device,
 the second wireless network device to transmit a location code to the first wireless network device.

4. A system for use in a well, comprising:
 a tool containing a first wireless network device, the tool movable in the well during a downhole operation;
 a second wireless network device for location in the well,
 wherein the first wireless network device is outside a wireless communication range of the second wireless network device until the tool is moved into proximity of the second wireless network device; and
 at least another wireless network device for location in the well, the first wireless network device to perform triangulation of signals to determine relative position of the tool to the second wireless network device and the at least another wireless network device.

5. A system for use in a well, comprising:
 a tool containing a first wireless network device, the tool movable in the well during a downhole operation;
 a second wireless network device for location in the well,
 wherein the first wireless network device is outside a wireless communication range of the second wireless network device until the tool is moved into proximity of the second wireless network device,
 the second wireless network device to send an actuating signal to the first wireless network device for actuating the tool once the tool comes within range of the second wireless network device.

6. The system of claim 5, wherein the tool comprises a perforating gun, and the actuating signal comprises a firing signal to fire the perforating gun.

7. The system of claim 5, wherein the tool comprises a valve actuated by the actuating signal.

8. The system of claim 5, wherein the tool comprises a release mechanism that releases sensors from the tool in response to the actuation signal.

9. The system of claim 5, wherein the tool comprises a sampler to take a sample in response to the actuating signal.

10. The system of claim 5, wherein the tool comprises a recorder that starts recording in response to the actuating signal.

11. The system of claim 5, wherein the tool includes a depth correlation device to correlate a position of the tool based on wireless communication between the first and second wireless network devices.

* * * * *